United States Patent Office 3,135,015
Patented June 2, 1964

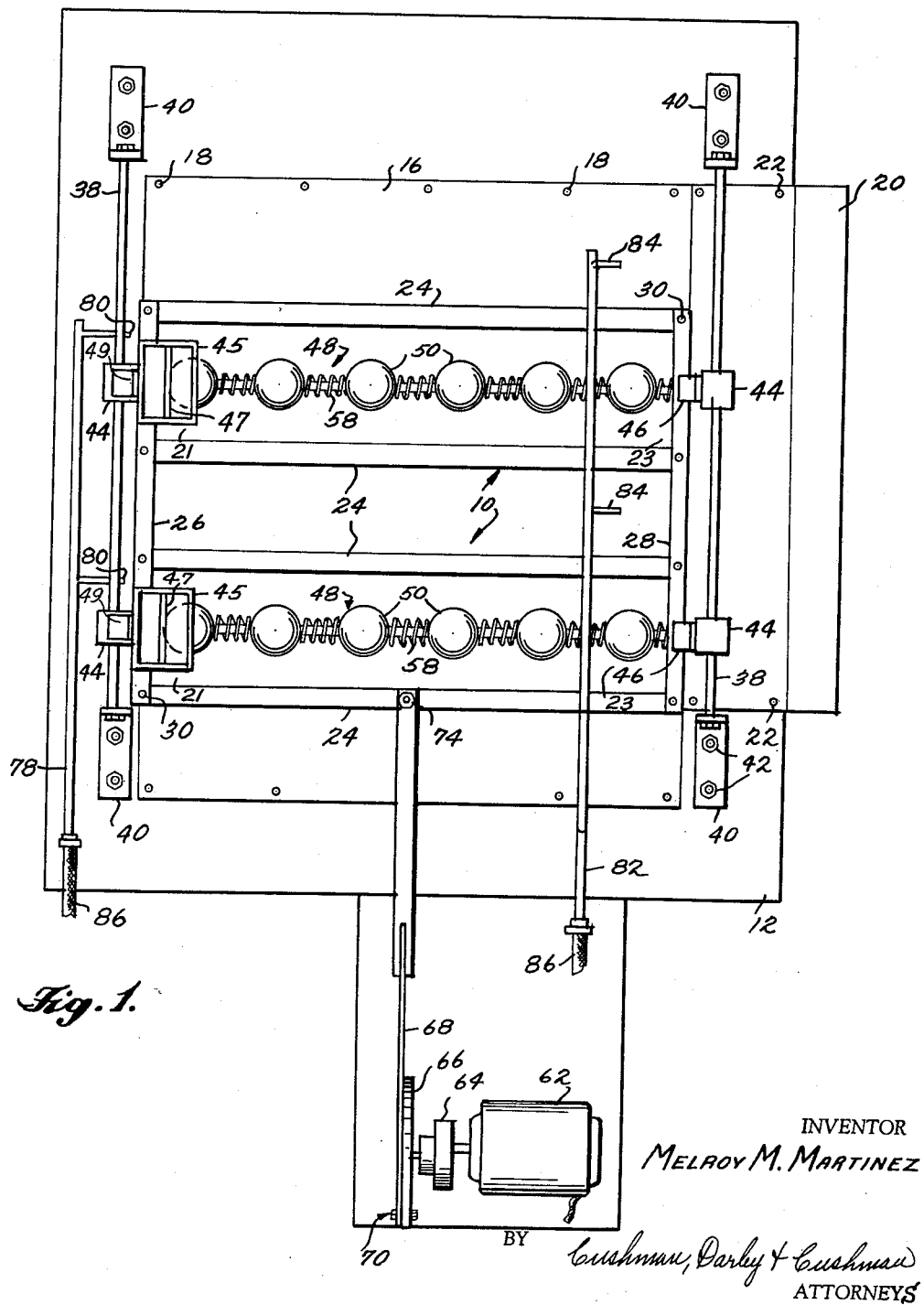

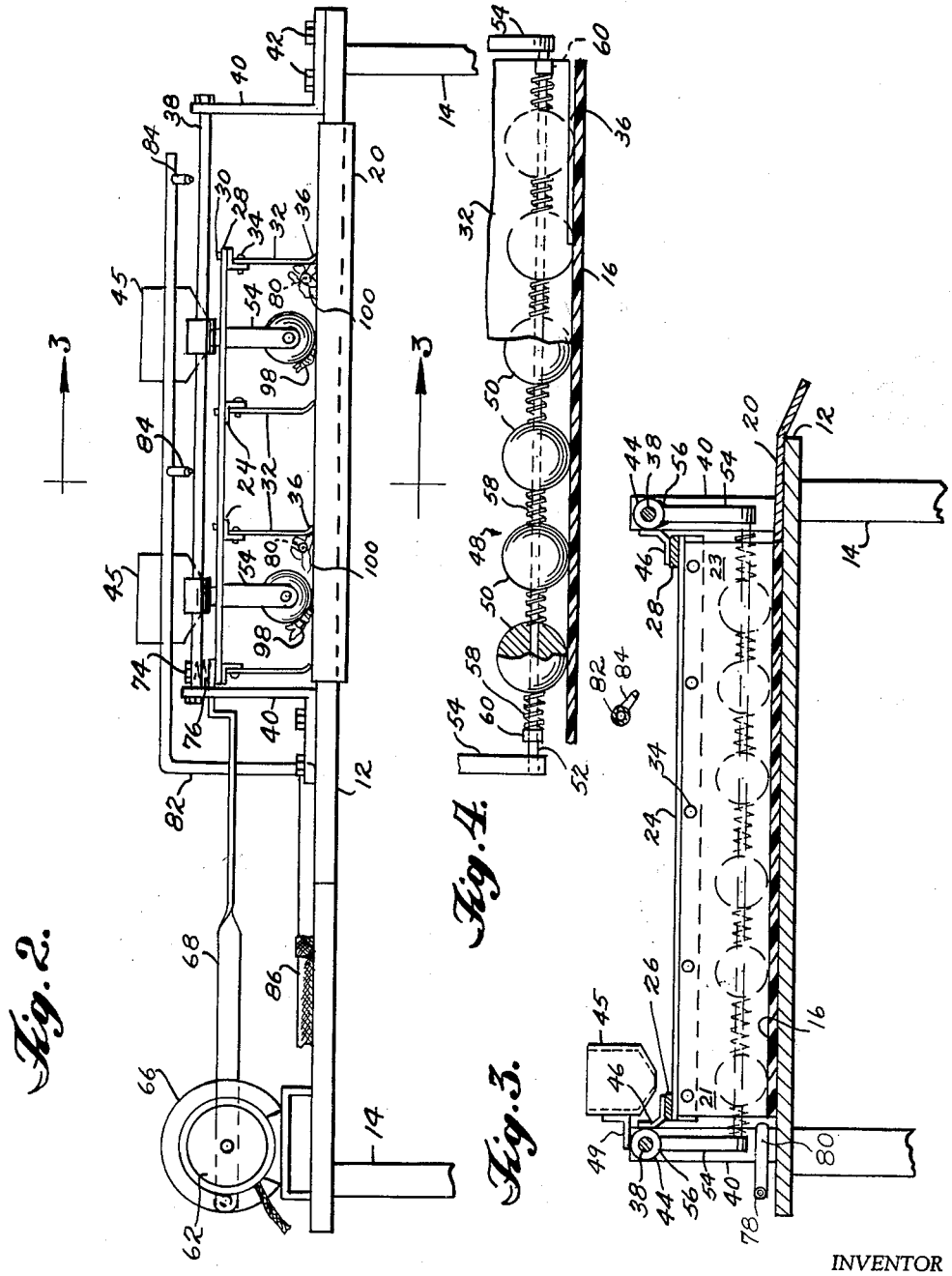

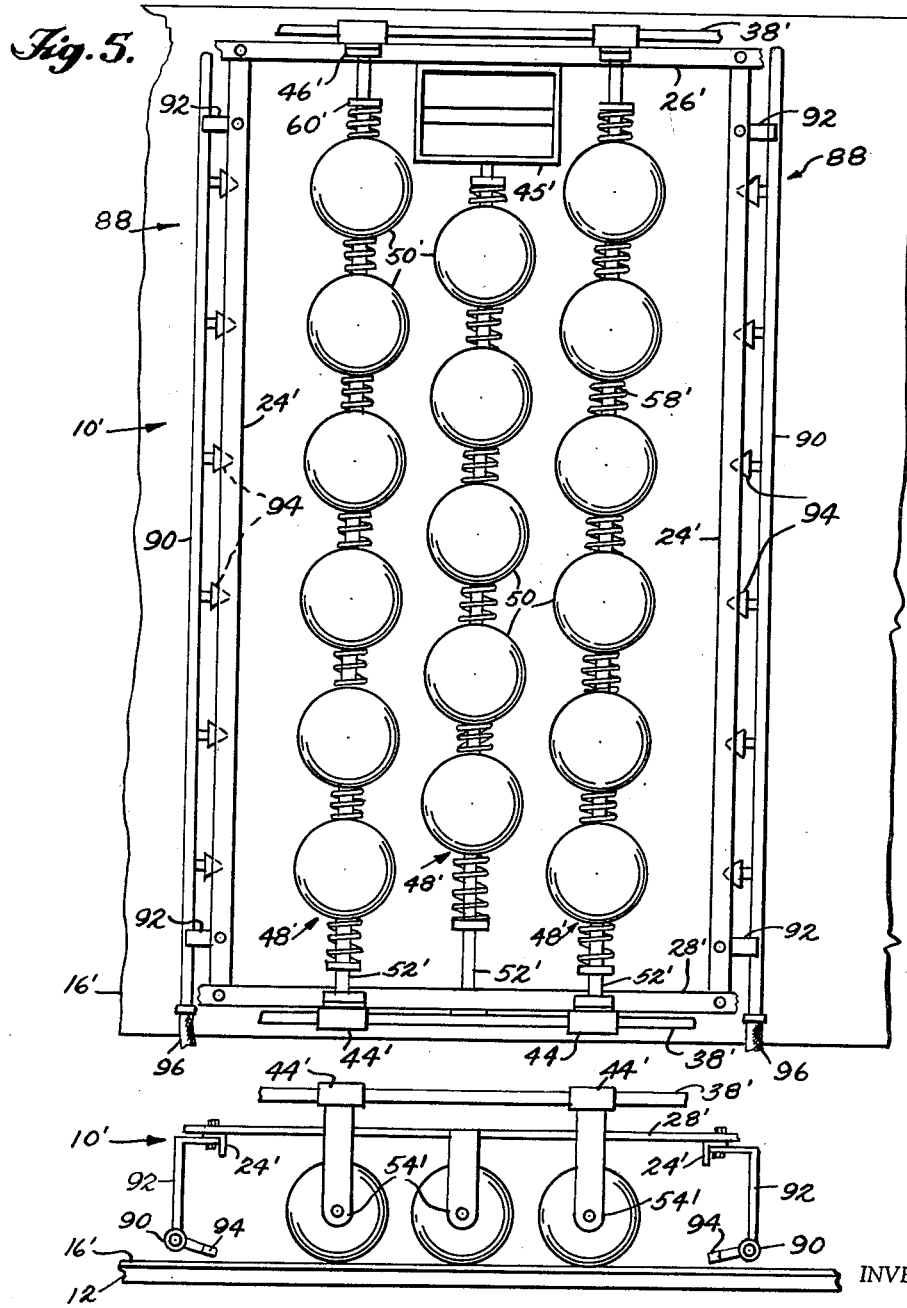

3,135,015
SHRIMP PEELING MACHINE
Melroy M. Martinez, 4711 Venus St., New Orleans, La., assignor of one-sixth to Joseph McCloskey and one-sixth to Moise W. Dennery, both of New Orleans, La.
Filed June 28, 1961, Ser. No. 120,389
13 Claims. (Cl. 17—2)

This invention relates to shrimp peeling machines and in particular to an improved construction in which opposed flat and spherical surfaces pinch the shrimp thereby completely peeling and cleaning the same by breaking, loosening and removing the head, legs and shell from the meat, and in which wiper elements tumble the shrimp over the flat surface.

Prior machines generally accomplish either a peeling or cleaning function by pinching the shrimp between oppositely rotating, smooth surfaced cylindrical rollers. In this type of construction the shrimp are held in the crotch of the oppositely rotating rollers, while part of the shell and other trash are removed by the pinching action of the rollers and carried between the rollers to the opposite side. In another type of machine, which removes the remainder of the shell and other trash from partially peeled shrimp which have been treated as just described, the shrimp pass between rollers and a fixed opposed surface, the rollers being resiliently mounted so that they may ride up on and over the shrimp during the cleaning operation.

In the machine of the present invention, however, the shrimp are alternately acted on by two different shell-removing structures. First, the shrimp are pinched between and abraded by rotatable spheres and a fixed surface without passing between the two; and second, the shrimp are tumbled or wiped, over the fixed surface, before another pinching force is applied. The result is that the shrimp are peeled and cleaned by the same machine.

To accomplish these functions, the machine of the present invention includes a plurality of spheres rotatably mounted on a common shaft within a frame, a shrimp receiving surface in continuous engagement with the spheres, means for imparting reciprocal motion between the spheres and the surface, and wiping means supported by the frame for wiping the shrimp along the surface during the movement of the frame. It has been found that the action of the rotating spheres on shrimp pinched between them and the surface readily removed the head and feet, and splits and loosens the shell. The tumbling or wiping of the partially peeled shrimp over the surface between alternate pinching steps has been found to readily remove the loosened shell yielding clean shrimp.

It is an object of the present invention to provide an improved shrimp peeling and cleaning machine which efficiently removes substantially all of the head, shell and legs from the meat of a shrimp.

It is a further object to provide an improved shrimp peeling and cleaning machine which includes rotatable spheres in continuous engagement with a shrimp receiving surface for pinching and abrading the head, shell and legs from the meat of a shrimp.

It is a further object to provide an improved shrimp peeling and cleaning machine which includes means for alternately tumbling, or wiping, the shrimp across a shrimp receiving surface and pinching the shrimp between rotatable spheres and the surface.

These and other objects and advantages will become apparent from a reading of the following detailed description of two illustrative embodiments of the invention taken in conjunction with the drawing in which:

FIGURE 1 is a top plan view of a shrimp peeling machine embodying the principles of the present invention;

FIGURE 2 is an elevational view of the rear or discharge end of the shrimp peeling machine of FIGURE 1;

FIGURE 3 is an enlarged sectional view taken on the line 3—3 of FIGURE 2;

FIGURE 4 is an enlarged fragmentary view of part of the shrimp peeling machine of FIGURE 1;

FIGURE 5 is a top plan view of an alternative form of sphere assembly and wiper assembly; and FIGURE 6 is an end elevational view of the structure of FIGURE 5.

Referring to the drawings, there is shown in FIGURES 1–4 an illustrative embodiment of a shrimp peeling and cleaning machine which includes a pair of spaced peeling assemblies 10 mounted above a table top 12 which is supported by legs 14. A rubber pad 16 which serves as a shrimp receiving surface is secured to the upper surface of the table top 12 below the peeling assemblies 10 as by a plurality of spaced screws 18 inserted through the edges of the pad into the table top. Adjacent one edge of the rubber pad 16, a piece of sheet metal 20 is attached to the table top as with spaced screws 22 and projects downwardly over the edge of the table top to form a shrimp discharge surface.

Each peeling assembly 10 includes a generally rectangular frame having an inlet end 21 and an outlet end 23 and constructed of two parallel side members 24, a front member 26 and a rear member 28. As shown, a single front member 26 and a single rear member 28 are provided and four parallel side members are attached transversely thereto as by bolts 30. The side members 24 may conveniently be strips of angle iron, and the front and rear members 26 and 28 may conveniently be flat metal strips.

A rectangular wiper strip 32 of resilient material, such as rubber, is attached as by bolts 34 along the lower edge of each side member 24. As seen in FIGURES 2 and 3, the strips 32 extend to engagement with the rubber pad 16 along their lower edge and are slightly flexed thereby. The right wiper strip 32 of each peeling assembly 10 near the rear thereof may have a narrow horizontal portion cut away to form a slot 36 between the strip and the pad. The height of the slot 36 should be less than the smallest dimension of a shrimp so as to permit the passage therethrough of shell and other trash but not whole shrimp or shrimp meats.

The peeling assemblies 10 are positioned a fixed distance above the table top 12 by a pair of parallel horizontal guide shafts 38 which extend parallel to the front and rear members 26 and 28 and to the table top 12. The guide shafts 38 are rigidly supported at their ends in any suitable manner as by angle brackets 40 which may be bolted to the table top 12 with bolts 42. The length of the guide shafts is greater than the combined widths of the peeling assemblies 10 in order to permit the assemblies to be moved back and forth in a horizontal plane. The assemblies are slidably supported on the shafts 38 by means of thrust bearings 44 which slidably engage the shafts and which are secured to the front and back members of the assemblies 10 as by angle brackets 46. As shown, one bearing 44 is located at each end of each assembly 10.

A feed hopper 45 having a bottom discharge slot 47 is provided above the forward or inlet end 21 of each peeling assembly. The hoppers may be secured to the assemblies by any convenient means, as by brackets 49 which may may be welded to the top of the bearings 44.

Each peeling assembly 10 also includes a sphere assembly 48 having a plurality of identical rigid spheres 50 rotatably mounted on a common shaft 52 for rolling engagement with the rubber pad 16. The shaft 52 extends parallel to the side members 24 from one end of the peeling assembly to the other and is suitably journaled at each end in bearings 54 which are secured to the lower surfaces of the thrust bearings 44 as by welds 56. As seen best in FIGURE 4, spheres 50 are slidably and rotatably mounted on the shaft and preferably are yieldingly held in predetermined spaced relationship by spiral springs 58. The springs 58 and the spheres 50 are retained on the shaft 52 between a pair of collars 60, one of which is secured near each end of the shaft. As shown, six spheres are mounted on the shaft, but a greater or lesser number may be employed if desired. A diameter of about three inches has found suitable, but spheres having a greater or lesser diameter may be employed. The spheres may be constructed of any suitable material, such as wood, metal or hard plastic.

Any suitable means for reciprocating the peeling assemblies 10 on the guide shafts 38 may be provided. As shown, an electric motor 62, through a reduction drive 64 rotates a drive wheel 66 which has a reciprocating connecting rod 68, attached at one end to the wheel by means of a suitable stud and bearing assembly 70. The other end of the connecting rod 68 is connected to the top of the nearest side member 24 of one of the peeling assemblies by means of a bolt 74 which passes through a vertical hole in the connecting rod. A spiral spring 76 around the bolt 74 between the side member 24 and the connecting rod yieldingly compensates for the vertical component of the connecting rod movement. As shown, the drive wheel 66 has a diameter such that the full stroke of the connecting rod is approximately the width of one of the peeling assemblies. The length of a stroke, however, may be increased over that shown.

A series of water jets are provided for moving the shrimp and separated parts thereof rearwardly in the peeling assemblies. A first water supply pipe 78 is provided with a pair of spray heads 80 located in fixed positions just above the front edge of the rubber pad 16. Each spray head is located adjacent the inlet end of one of the peeling assemblies 10 and has its discharge opening pointing toward the rear of the machine. As second fixed water supply pipe 82 extends above the assemblies and is provided with a pair of downwardly and rearwardly projecting spray heads 84 which are located somewhat rearwardly of the spray heads 80. Each of the supply pipes 78 and 82 is suitably connected as by means of hoses 86 to water source (not shown).

FIGURES 5 and 6 illustrate an embodiment of the present invention in which the wiper strips 32 of FIGURE 1–4 are replaced by a series of water sprays or water wipers 88, attached to each of the side members 24' of the peeling assemblies 10'. Each water wiper 88 includes a pipe 90 coextensive with a side member 24' of the frame assembly and rigidly attached thereto in any suitable manner as by L-shaped brackets 92. Each pipe 90 is provided with a plurality of longitudinally spaced spray heads 94 which project inwardly and downwardly from the pipe. One end of each pipe is closed and the other is suitably connected to one end of a flexible water supply line 96 leading to a water source (not shown). As shown, the pipes 90, each having six spray heads 94 projecting therefrom are positioned just above the surface of the pad 16', but the precise position of the pipe and number of spray heads may be varied, it being desired only to provide sufficient water flow and proper direction thereof to move the shrimp along the pad during movement of the peeling assemblies 10'.

Additionally, FIGURES 5 and 6 illustrate a modified peeling assembly 10' in which a plurality of spaced parallel sphere assemblies 48' are mounted within the frame assembly. As seen in FIGURE 5, the spheres 50' of adjacent assemblies are preferably staggered with respect to each other so as to provide more shrimp pinching action during movement of the frame than would be achieved if the spheres were in line. The peeling assembly 10' may be supported on the horizontal guide shafts 38' by means of two thrust bearings 44' mounted on each of the front and rear members 26 and 28 in the same manner as described above with respect to FIGURES 1–4. The axles 52' of the two outside sphere assemblies 48' are journaled in bearings 54' depending from the thrust bearings in the manner described above and the axle 52' of the center sphere assembly is journaled in bearings 54' depending from and rigidly secured to the front and back members 26' and 28' in any suitable manner.

The general operation of the shrimp peeling machine illustrated in FIGURES 1–4 is readily apparent from the above description. To begin operation, the motor 62 is activated to reciprocate the peeling assemblies 10 on the fixed guide rods 38 by means of the drive linkage between the motor and the nearest assembly. Water is then delivered to the upper and lower spray heads 84 and 80 through their respective supply pipes. Finally, whole shrimp, with head, legs and shell attached, are fed into the hoppers by hand or by machine and allowed to fall through the discharge slots 47 onto the shrimp receiving pad 16 inside each peeling assembly at the forward end thereof.

Each lower water spray 80 continually ejects a jet of water which passes through the open fronts of the peeling assemblies 10 and strikes any shrimp in or near the axis of the spray head, and in so doing moves the shrimp rearwardly over the pad 16 toward the discharge end of the assemblies. Since, in the embodiment illustrated, the assemblies continually move back and forth across the axis of the lower water spray, all the shrimp will be subjected to the force of the water during each stroke. Depending on the length of the stroke and the position of the spray heads 80, the shrimp may be moved only intermittently or more or less continuously. Obviously, the number and spacing of the spray heads 80, the spacing between the assemblies 10 and the length and period of the stroke may be varied without departing from the principle of the invention.

The operation of the sphere assemblies 48 on the shrimp during reciprocation of the peeling assemblies 10 in combination with the effect of the wipers effectively removes substantially all of the head, legs and shell from the shrimp as they pass through the peeling assemblies. As the spheres 50 roll across the pad 16, some of the shrimp will be caught or pinched between the pad and the leading periphery of the spheres 50, as seen at 98 in FIGURE 2, and will be pushed along the pad in abrasive contact therewith. Simultaneously the rotating surface of the spheres will rub against those shrimp which have been caught between pad and spheres. At the end of a stroke, the direction of the peeling assemblies and consequently the direction of rotation of the spheres will reverse thus freeing the pinched shrimp and catching others on the return stroke. As seen in FIGURE 2, the spheres have just completed a stroke to the left and are about to move to the right. During each stroke, some of the shrimp will pass between the spheres and will be tumbled and wiped over the pad by one of the wipers as seen at 100 in FIGURE 2. As these free shrimp are moved across the jet of water from the lower spray head 80 by the wiper, the force of the water moves them slightly rearwardly inside the assemblies. As the shrimp approach the discharge end of the assemblies, much of the shells and other trash which has been removed by the spheres and wipers will be passed over by the right wipers as a result of the slots 36 therein. This refuse will then be swept away by the jets of water from the upper spray heads 84, into suitable containers (not shown) which may be movable so as to be brought into alignment with spray heads 84 at proper intervals. Finally, the shrimp meats, which now have been detached from substantially all particles of shell, legs and head, are moved out of the assemblies by the action of the jets from the upper and lower spray heads 80 and 84 and fall from the chute 20 into a suitable container (not shown).

The action of the spheres 50 on the shrimp has several effects. Firstly, as a whole shrimp comes into contact with a rolling sphere, the comparatively hollow head section is crushed and removed. Additionally, when a shrimp becomes wedge between a sphere and the pad, it tends to curl around the sphere, as seen in FIGURE 2, and is pushed along the pad. Since the sphere cannot roll up over the shrimp, it continues to rotate and thereby abrades the underbody of the shrimp tearing away the legs and loosening the shell along the length of the shrimp. Simultaneously, the abrasive action of the pad on the opposite side of the shrimp tends to tear off the loosened shell. Obviously, all of these effects are not completed during a single stroke of the sphere assemblies, nor are all the shrimp acted on by spheres during a single stroke. However, after having been wiped back and forth many times during reciprocation of the assemblies, each shrimp will have been acted on by a sphere a sufficient number of times to effectively remove its head and loosen its shell.

The action of the wipers not only tumbles and mixes the shrimp alternately with the shell loosening effects of the spheres, but in wiping them over the pad tends to tear off the loosened shells. The trash-free meats of the shrimp being slippery are not damaged by the action of either the wipers or the spheres.

The operation and effect of the spheres in the peeling assemblies 10' of FIGURES 5 and 6 is the same as in assembly 10 described above. The shrimp are alternately pinched and wiped, the primary difference being that jets of water from the water wipers 88, rather than the mechanical wipers 32, move the shrimp from side to side with movement of the assembly. The water wipers, of course, do not provide a slot between pad and wipers and therefore meats and trash are removed from the assemblies simultaneously.

Thus, it will be appreciated that the invention described and illustrated herein provides a novel and efficient apparatus for removing the shells, heads and legs from whole shrimp. While two preferred embodiments have been disclosed, it should be understood that the invention is not limited to the specific details thereof and that various other modifications are contemplated. For example, while the peeling assemblies have been illustrated as movable over the shrimp receiving surface, any suitable means for establishing relative movement between the assemblies and surface may be employed.

What is claimed is:

1. A shrimp peeling and cleaning machine comprising: means defining a shrimp-receiving surface having a shrimp inlet end and a shrimp discharge end defining the longitudinal dimension of said surface; a plurality of spheres each rotatable about an axis parallel to said surface and extending along said longitudinal dimension; means holding said spheres in continual engagement with said surface; means for imparting reciprocal motion between said spheres and said surface in a plane transverse to the longitudinal dimension of said surface whereby said spheres roll on said surface simultaneously pinching some of the shrimp between said surface and the leading periphery of said spheres and pushing the shrimp along said surface in said transverse direction; and shrimp wiper means spaced transversely from said spheres on each side thereof for urging along said surface in said transverse plane some of the shrimp which are not pinched between said spheres and said surface.

2. A machine as in claim 1 in which said spheres are yieldably mounted so as to be displaceable along their axes of rotation upon meeting with excessive resistance to rolling movement.

3. A machine as in claim 1 in which said wiper means comprises means for ejecting a spray of water against said surface.

4. A machine as in claim 1 in which said wiper means comprises a flexible strip in engagement with said surface.

5. A machine as in claim 4 in which said flexible strip has a portion thereof spaced from said surface whereby shrimp shells and other trash may pass between the flexible sheet and the surface.

6. A shrimp peeling and cleaning machine comprising: means defining a generally flat shrimp receiving surface having a shrimp inlet end and a shrimp discharge end defining the longitudinal dimension of said surface; a plurality of rotatable spheres in continual engagement with said surface and rotatable about axes generally longitudinal to said surface; means for imparting relative reciprocal motion between said spheres and said surface transverse to said surface whereby said spheres roll on said surface to simultaneously pinch shrimp between said surface and the leading periphery of said spheres and push the pinched shrimp along said surface; shrimp wiper means fixed relative to and spaced from said spheres and opposed to said surface along a longitudinal portion thereof whereby shrimp may be swept transversely over said surface; and means for moving said shrimp longitudinally along said surface from said inlet end to said discharge end.

7. A shrimp peeling machine comprising: means defining a shrimp receiving surface; frame means supporting a periphery of spaced axles a fixed distance from and parallel to said surface; a plurality of spheres rotatably mounted on each axle and continuously engaging said surface, the spheres on each axle being off-set relative to the spheres on adjacent axles; means for imparting relative reciprocating movement between said frame means and said surface in a direction transverse to the axes of said axles whereby shrimp are simultaneously pinched between the leading periphery of said spheres and said surface and pushed along said surface by said spheres first in one direction and then in the opposite direction and whereby abrading action between said surface and the shrimp and between said spheres and the shrimp loosens the shell of the shrimp; shrimp wiper means parallel with said axles and laterally spaced from said spheres, said wiper means being supported by said frame in fixed relation to said spheres whereby shrimp are swept over said surface by said wiper means during said relative motion; and means for moving the shrimp in a direction parallel to said axles.

8. A machine as in claim 6 in which said wiper means comprises means for ejecting a spray of water against said surface.

9. A machine as in claim 6 in which said wiper means comprises a flexible strip having an edge in engagement with said surface along at least a portion of said edge.

10. A machine as in claim 9 in which said flexible strip has a portion thereof spaced from said surface whereby shrimp shells and other trash may pass between the flexible sheet and the surface.

11. A machine as in claim 6 in which said spheres are yieldably mounted so as to be displaceable along their axes of rotation upon meeting with excessive resistance to rolling movement.

12. A machine as in claim 6 wherein said spheres and said wiper means are carried by a frame and wherein said means for imparting relative reciprocal movement includes means for moving said frame transversely of said surface.

13. A machine as in claim 7 in which springs are mounted on each axle between the spheres so that the spheres are displaceable along the axle upon meeting excessive resistance to rolling movement.

References Cited in the file of this patent
UNITED STATES PATENTS

| | | |
|---|---|---|
| 676,254 | Hofmann | June 11, 1901 |
| 2,637,065 | Lapeyre et al. | May 5, 1953 |
| 2,858,563 | Rodriguez | Nov. 4, 1958 |
| 2,988,771 | Lapeyre | June 20, 1961 |